(12) United States Patent
Steele (10) Patent No.: US 10,822,026 B2
(45) Date of Patent: Nov. 3, 2020

(54) DUAL STEERING CYLINDER SYSTEM

(71) Applicant: Deere & Company, Moline, IL (US)

(72) Inventor: David M. Steele, Hudson, IA (US)

(73) Assignee: DEERE & COMPANY, Moline, IL (US)

( * ) Notice: Subject to any disclaimer, the term of this patent is extended or adjusted under 35 U.S.C. 154(b) by 175 days.

(21) Appl. No.: 16/048,452

(22) Filed: Jul. 30, 2018

(65) Prior Publication Data

US 2020/0031389 A1    Jan. 30, 2020

(51) Int. Cl.
| | |
|---|---|
| *B62D 5/12* | (2006.01) |
| *B62D 5/06* | (2006.01) |
| *B62D 7/20* | (2006.01) |
| *B62D 65/00* | (2006.01) |

(52) U.S. Cl.
CPC ............... *B62D 5/12* (2013.01); *B62D 5/062* (2013.01); *B62D 7/20* (2013.01); *B62D 65/00* (2013.01)

(58) Field of Classification Search
CPC .................................. B62D 5/12; B62D 5/062
See application file for complete search history.

(56) References Cited

U.S. PATENT DOCUMENTS

| | | | | |
|---|---|---|---|---|
| 3,826,328 | A | * | 7/1974 | Sheppard ................. B62D 5/30 180/406 |
| 6,047,788 | A | * | 4/2000 | Bohner ..................... B62D 5/12 180/406 |
| 6,520,277 | B1 | | 2/2003 | Bowman et al. |
| 7,331,419 | B2 | | 2/2008 | Sikora |
| 8,353,377 | B2 | | 1/2013 | Geiger |

FOREIGN PATENT DOCUMENTS

| | | |
|---|---|---|
| CA | 1110178 A | 10/1981 |
| CN | 203358672 U | 12/2013 |
| DE | 4130989 A1 * 3/1992 | ............... B62D 5/22 |
| EP | 1600311 A1 | 11/2005 |

\* cited by examiner

*Primary Examiner* — Kevin Hurley
(74) *Attorney, Agent, or Firm* — Taft Stettinius & Hollister LLP; Stephen F. Rost (57) ABSTRACT

A steering system includes a drag link having a first support bushing opposite a second support bushing, a first steering hydraulic cylinder operably connected to the drag link, a second steering hydraulic cylinder operably connected to the drag link, a first tie rod operably connected to the drag link, and a second tie rod operably connected to the drag link. Each of the first and second cylinders and first and second tie rods are arranged to apply a corresponding radial force that is distributed between the first and second support bushings. One or more of the first and second steering cylinders and/or the first and second tie rods is positioned relative to the drag link to minimize a net summation of the first and second cylinder radial forces and the first and second tie rod radial forces that are applied to the first and second support bushings.

17 Claims, 8 Drawing Sheets

DUAL STEERING CYLINDER SYSTEM

FIELD OF THE DISCLOSURE

The present disclosure relates to a steering system for a machine, and in particular to the steering system including dual steering cylinders and dual tie rods.

BACKGROUND OF THE DISCLOSURE

Some machines include a hydraulic power steering system with dual, double-acting piston-cylinder units. Dual hydraulic cylinders are arranged co-axially to effectively double the hydraulic force at the tie rod connection. However, this arrangement does not provide the cancellation of the induced moments.

Other machines include a steering system with multiple hydraulic power assisting cylinders and multiple cylinders attached to the steering system to increase the steering force. This design does not provide the cancelation of the induced moments.

Other machines include a dual steering system for off-highway vehicles that include a redundant steering system for primary and emergency steering. Yet other machines include a tractor steering cylinder with internal adjustable steering stops. Yet other machines include an independent front suspension and use a single steering cylinder which is positioned in front of the axle axis. Alternatively, other machines include an independent front suspension and use a single steering cylinder which is positioned behind the axle axis. All of these designs do not provide the cancelation of the induced moments. Cancelation of the induced moments is beneficial as this results in a decreased steering force at the wheel because of reduced internal drag as the drag link traverses relative to the support bushings. Cancelation of the induced moments is also beneficial as this allows for usage of smaller, less expensive support bushings.

Thus there is a need for improvement for steering systems.

SUMMARY

According to one embodiment of the present disclosure, a steering system for a work vehicle, comprising: a drag link having a longitudinal axis that spans the length of the drag link, the drag link having a vertical plane that is perpendicular to the longitudinal axis, the drag link having a first support bushing opposite a second support bushing; a first steering hydraulic cylinder operably connected to the drag link, the first steering hydraulic cylinder oriented at a first cylinder angle relative to the vertical plane of the drag link to induce a first cylinder radial force that is distributed between the first and second support bushings; a second steering hydraulic cylinder operably connected to the drag link, the second steering hydraulic cylinder oriented at a second cylinder angle relative to the vertical plane of the drag link to induce a second cylinder radial force that is distributed between the first and second support bushings; a first tie rod operably connected to the drag link, the first tie rod oriented at a first tie rod angle relative to the vertical plane of the drag link to induce a first tie rod radial force that is distributed between the first and second support bushings; a second tie rod operably connected to the drag link, the second tie rod oriented at a second tie rod angle relative to the vertical plane of the drag link to induce a second tie rod radial force that is distributed between the first and second support bushings; and wherein at least one of the first cylinder angle, the second cylinder angle, the first tie rod angle, and the second tie rod angle is optimized to minimize a net summation of the first cylinder radial force, the second cylinder radial force, the first tie rod radial force, and the second tie rod radial force that is applied to the first and second support bushings.

In one example, the net summation is less than any one of the first cylinder radial force, the second cylinder radial force, the first tie rod radial force, and the second tie rod radial force that is applied to the first and second support bushings.

In a second example, the first cylinder angle and the second cylinder angle are optimized such that the net summation of the first cylinder radial force, the second cylinder radial force, the first tie rod radial force, and the second tie rod radial force is minimized.

In a third example, the net summation of the first cylinder radial force, the second cylinder radial force, the first tie rod radial force, and the second tie rod radial force is substantially 0.

In a fourth example, the first steering hydraulic cylinder is oriented in a direction opposite to a direction of the second steering hydraulic cylinder relative to the vertical plane that is perpendicular to the longitudinal axis.

In a fifth example, the first steering hydraulic cylinder is laterally offset a first cylinder distance from the longitudinal axis to induce a first cylinder moment and the second steering hydraulic cylinder is laterally offset a second cylinder distance from the longitudinal axis to induce a second cylinder moment, wherein the first and second cylinder moments are distributed between the first and second support bushings; wherein the first tie rod and the second tie rod are positioned to induce a first tie rod moment and a second tie rod moment, respectively, wherein the first and second tie rod moments are distributed between the first and second support bushings; and wherein at least one of the first cylinder distance and the second cylinder distance is optimized to minimize a net summation, at the first and second support bushings, of the first cylinder moment, the second cylinder moment, the first tie rod moment, and the second tie rod moment.

In a sixth example, the first steering hydraulic cylinder is arranged at the first cylinder angle and the second steering hydraulic cylinder is arranged at the second cylinder angle such that a net summation, at the first and second support bushings, of the first cylinder radial force, the second cylinder radial force, the first tie rod radial force, and the second tie rod radial force is substantially 0.

In a seventh example, the drag link includes a first connector adjacent a first support bushing and a second connector adjacent a second support bushing, wherein a first end of the first steering hydraulic cylinder is attached to the first connector and a first end of the second steering hydraulic cylinder is attached to the second connector.

In an eighth example, the first steering hydraulic cylinder includes a second end attached to a frame of the work vehicle, the frame having an axle axis, the second steering hydraulic cylinder includes a second end attached to the frame, the drag link is located forward of the axle axis.

In a ninth example, the first steering hydraulic cylinder includes a second end attached to a frame of the work vehicle, the frame having an axle axis, the second steering hydraulic cylinder includes a second end attached to the frame, the drag link is located rearward of the axle axis.

According to one embodiment of the present disclosure, a method of assembling a steering system for a work vehicle, comprising: providing a drag link having a first support bushing opposite a second support bushing, the drag link having a longitudinal axis that spans the length of the drag link, the drag link having a vertical plane perpendicular to the longitudinal axis; arranging a first steering hydraulic cylinder at a first cylinder angle relative to the vertical plane of the drag link to induce a first cylinder radial force that is distributed between the first and second support bushings; arranging a second steering hydraulic cylinder at a second cylinder angle relative to the vertical plane of the drag link to induce a second cylinder radial force that is distributed between the first and second support bushings; attaching a first tie rod to the drag link to induce a first tie rod radial force that is distributed between the first and second support bushings; attaching a second tie rod to the drag link to induce a second tie rod radial force that is distributed between the first and second support bushings; optimizing at least one of the first cylinder angle and the second cylinder angle to minimize a net summation of the first cylinder radial force, the second cylinder radial force, the first tie rod radial force, and the second tie rod radial force that is resolved at the first and second bushings.

In one example, the net summation of forces is minimized to substantially 0 kN.

In a second example, further comprising arranging the first tie rod at a first tie rod angle relative to the vertical plane of the drag link to induce the first tie rod radial force; arranging the second tie rod at a second tie rod angle relative to the vertical plane of the drag link to induce the second tie rod radial force; and optimizing the first and the second tie rod angles to minimize the net summation of the first cylinder radial force, the second cylinder radial force, the first tie rod radial force, and the second tie rod radial force that is resolved at the first and second bushings.

In a third example, further comprising arranging the first steering hydraulic cylinder laterally offset a first cylinder distance from the longitudinal axis to induce a first cylinder moment that is distributed between the first and the second support bushings; arranging the second steering hydraulic cylinder laterally offset a second cylinder distance from the longitudinal axis to induce a second cylinder moment that is distributed between the first and the second support bushings; applying a first tie rod moment from the first tie rod on the first and second support bushings; and applying a second tie rod moment from the second tie rod on the first and second support bushings; wherein at least one of the first cylinder distance and the second cylinder distance is optimized to minimize a net summation, at the first and second support bushings, of the first cylinder moment, the second cylinder moment, the first tie rod moment, and the second tie rod moment.

In another example, further comprising positioning the first steering hydraulic cylinder in a direction opposite to a direction of the second steering hydraulic cylinder relative to the vertical plane perpendicular to the longitudinal axis of the drag link.

In yet another example, the drag link includes a first connector adjacent a first support bushing and a second connector adjacent a second support bushing, attaching the first steering hydraulic cylinder to the first connector, the first connector sized to receive the first tie rod; and attaching the second steering hydraulic cylinder to the second connector, the second connector sized to receive the second tie rod.

In another example, further comprising arranging at least one of the first cylinder angle and the second cylinder angle to cancel the forces induced by the first tie rod, the second tie rod, the first steering hydraulic cylinder, and the second steering hydraulic cylinder.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Referring to FIGS. 1-6, a steering system 100 is shown. The steering system 100 includes a drag link 102 that includes a longitudinal axis LD that spans the length of the drag link 102. The drag link 102 has a vertical plane VP that is perpendicular to the longitudinal axis LD. The drag link 102 includes a housing 103 that supports a first support bushing 104 adjacent a second support bushing 106.

The drag link 102 includes a first steering knuckle or connector 108 that is operably connected to the first support bushing 104. The first connector 108 receives and retains a rod or first end 130 of a first steering hydraulic cylinder 109. The drag link 102 includes a second steering knuckle or connector 110 that is operably connected to the second support bushing 106. The second connector 110 receives and retains a rod or first end 132 of a second steering hydraulic cylinder 115. The drag link 102 further includes a first bolt 111 that attaches the first connector 108 to the first support bushing 104 and a second bolt 113 that attaches the second connector 110 to the second support bushing 106. The first and the second connectors 108, 110 are configured to respectively receive and retain first and second tie rods 116, 118, as described in more detail below.

The steering system 100 includes a first steering hydraulic cylinder 109 operably connected to the drag link 102. In particular, the first steering hydraulic cylinder 109 includes a rod or first end 130 that is connected to the first connector 108. The first steering hydraulic cylinder 109 is oriented at a first cylinder angle A relative to the vertical plane VP of the drag link 102 to induce a first cylinder radial force FCRF that is distributed between the first and second support bushings 104 and 106. All of the forces and moments applied to the first and second support bushings 104 and 106 are summed as a net summation of a first bushing reaction force FBRF and a second bushing reaction force SBRF. As described throughout the application, there are additional forces that are distributed between the first and second support bushings 104 and 106 and summed as the first bushing reaction force FBRF and the second bushing reaction force SBRF. The first steering hydraulic cylinder 109 is oriented in a direction opposite to a direction of a second steering hydraulic cylinder 115 relative to the vertical plane VP that is perpendicular to the longitudinal axis LD. The first steering hydraulic cylinder 109 is laterally offset a first cylinder distance FCD from the longitudinal axis LD to induce a first cylinder moment FCM that is distributed between the first and second support bushings 104 and 106 and contributes to the first bushing reaction force FBRF and the second bushing reaction force SBRF. The first cylinder distance FCD can be optimized to minimize a net summation, at the first and second support bushings 104 and 106, of one or more of the first cylinder moment FCM, the second cylinder moment SCM, the first tie rod moment FTRM, and the second tie rod moment STRM.

The steering system 100 includes a second steering hydraulic cylinder 115 operably connected to the drag link 102. In particular, the second steering hydraulic cylinder 115 includes a rod or first end 132 that is connected to the second connector 110. The second steering hydraulic cylinder 115 is oriented at a second cylinder angle B relative to the vertical plane VP of the drag link 102 to induce a second cylinder radial force SCRF that is distributed between the first and second support bushings 104 and 106 and contributes to the first bushing reaction force FBRF and the second bushing reaction force SBRF. The second steering hydraulic cylinder 115 is laterally offset a second cylinder distance SCD from the longitudinal axis LD to induce a second cylinder moment SCM that is distributed between the first and second support bushings 104 and 106. The second cylinder distance SCD can be optimized to minimize a net summation, at the first and second support bushings 104 and 106, of one or more of the first cylinder moment FCM, the second cylinder moment SCM, the first tie rod moment FTRM, and the second tie rod moment STRM.

The angles A and B, respectively, of the first and second hydraulic cylinders 109, 115 and the size of these cylinders when retracting and extending during operation of the vehicle further adjusts the radial forces applied by the first and second hydraulic cylinders 109, 115. Beneficially, the net summation of forces on the first and second support bushings 104 and 106 is substantially or near zero force on the drag link 102 so the drag link 102 is not bent. First and second hydraulic cylinders 109, 11 at corresponding angles A, B reduce the overall magnitude of load the first and second support bushings 104 and 106 have to resolve which reduces any twisting of the first and second support bushings 104 and 106. The first and second support bushings 104 and 106 can be smaller because the applied forces are smaller. Moreover, the first and second support bushings 104 and 106 are in a dry cavity.

The first steering hydraulic cylinder 109 includes a barrel or second end 140 attached to a frame of a work vehicle wherein the frame includes an axle axis. The second steering hydraulic cylinder 115 includes a barrel or second end 142 attached to the frame. In one form, the drag link 102 is located forward of the axle axis. In another form, the drag link 102 is located rearward of the axle axis.

The steering system 100 includes first tie rod 116 operably connected to the drag link 102. The first tie rod 116 includes a ball joint 150 configured for connection with the first connector 108. The first tie rod 116 is oriented at a first tie rod angle C relative to the vertical plane VP of the drag link 102 to induce a first tie rod radial force FTRRF that is distributed between the first and second support bushings 104 and 106 and contributes to the first bushing reaction force FBRF and the second bushing reaction force SBRF. The first tie rod 116 is positioned to induce a first tie rod moment FTRM that is distributed between the first and second support bushings 104 and 106 and contributes to the first bushing reaction force FBRF and the second bushing reaction force SBRF.

The steering system 100 includes a second tie rod 118 operably connected to the drag link 102. The second tie rod 118 includes a ball joint 152 configured for connection with the second connector 110. The second tie rod 118 is oriented at a second tie rod angle D (not illustrated) relative to the vertical plane VP of the drag link 102 to induce a second tie rod radial force STRRF that is distributed between the first and second support bushings 104 and 106 and contributes to the first bushing reaction force FBRF and the second bushing reaction force SBRF. The second tie rod 118 is positioned to induce a second tie rod moment STRM that is distributed between the first and second support bushings 104 and 106 and contributes to the first bushing reaction force FBRF and the second bushing reaction force SBRF.

Figure 1:
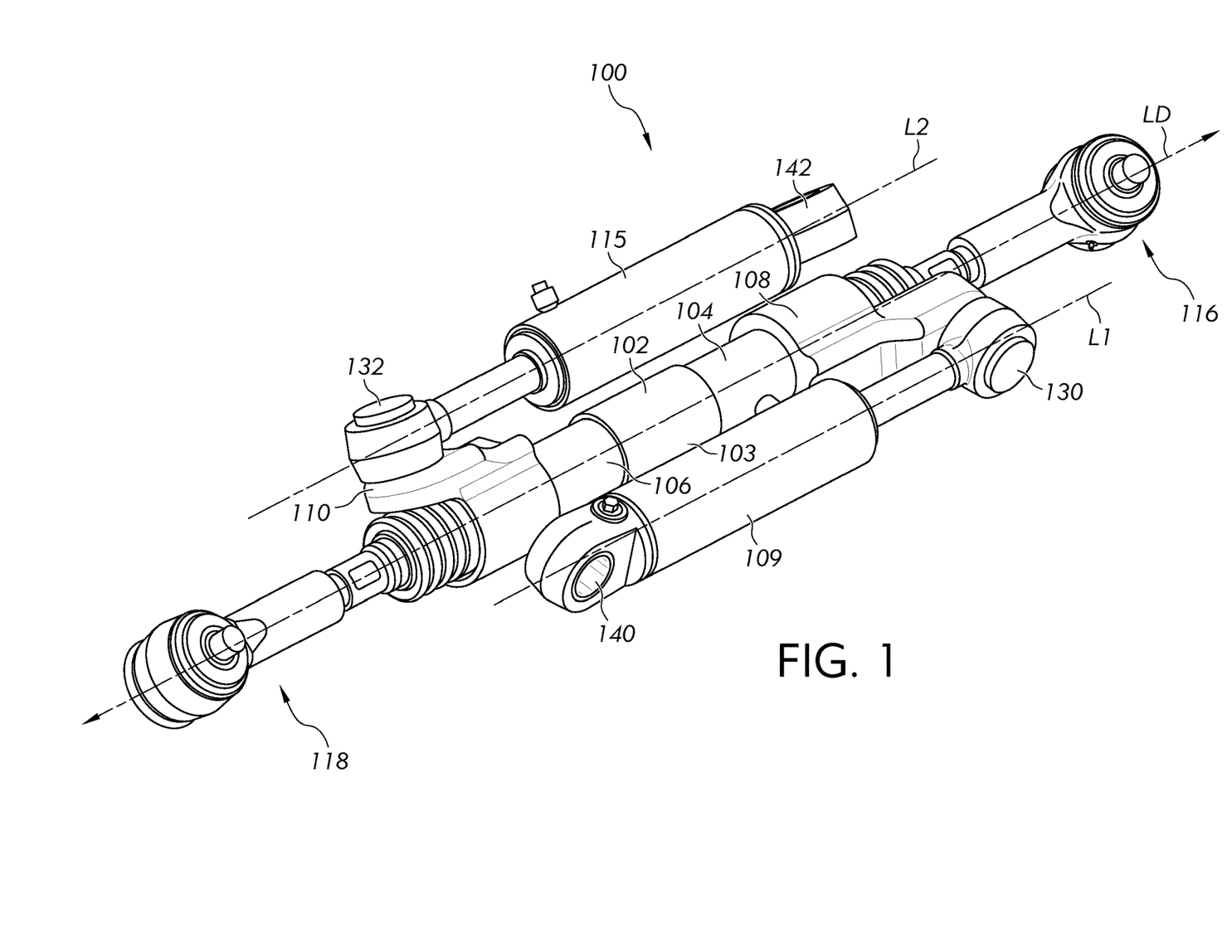
FIG. 1 is a top perspective view of a steering system.
Figure 2:
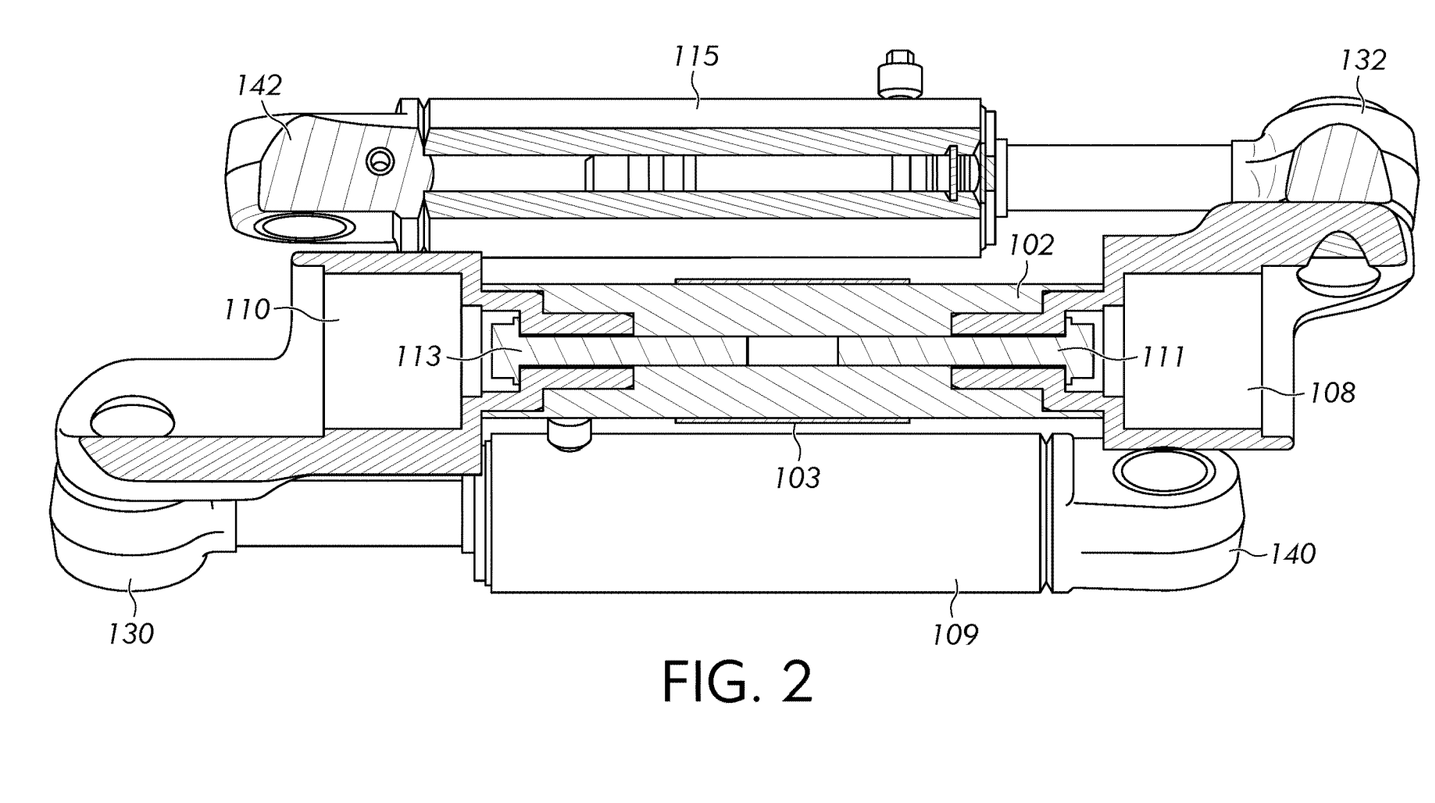
FIG. 2 is a partial cross-sectional view of the steering system of FIG. 1.
Figure 3:
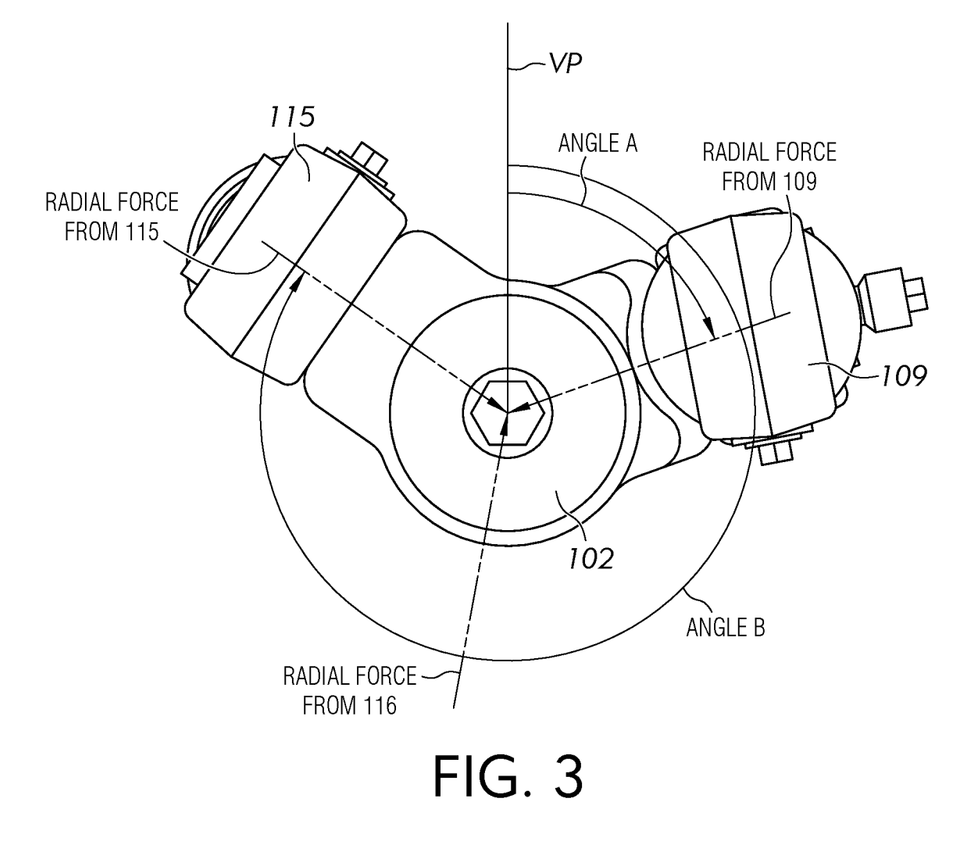
FIG. 3 is a partial cross-sectional view of the steering system of FIG. 1 illustrating radial forces and angles of application of the forces applied to the steering system.
Figure 4:
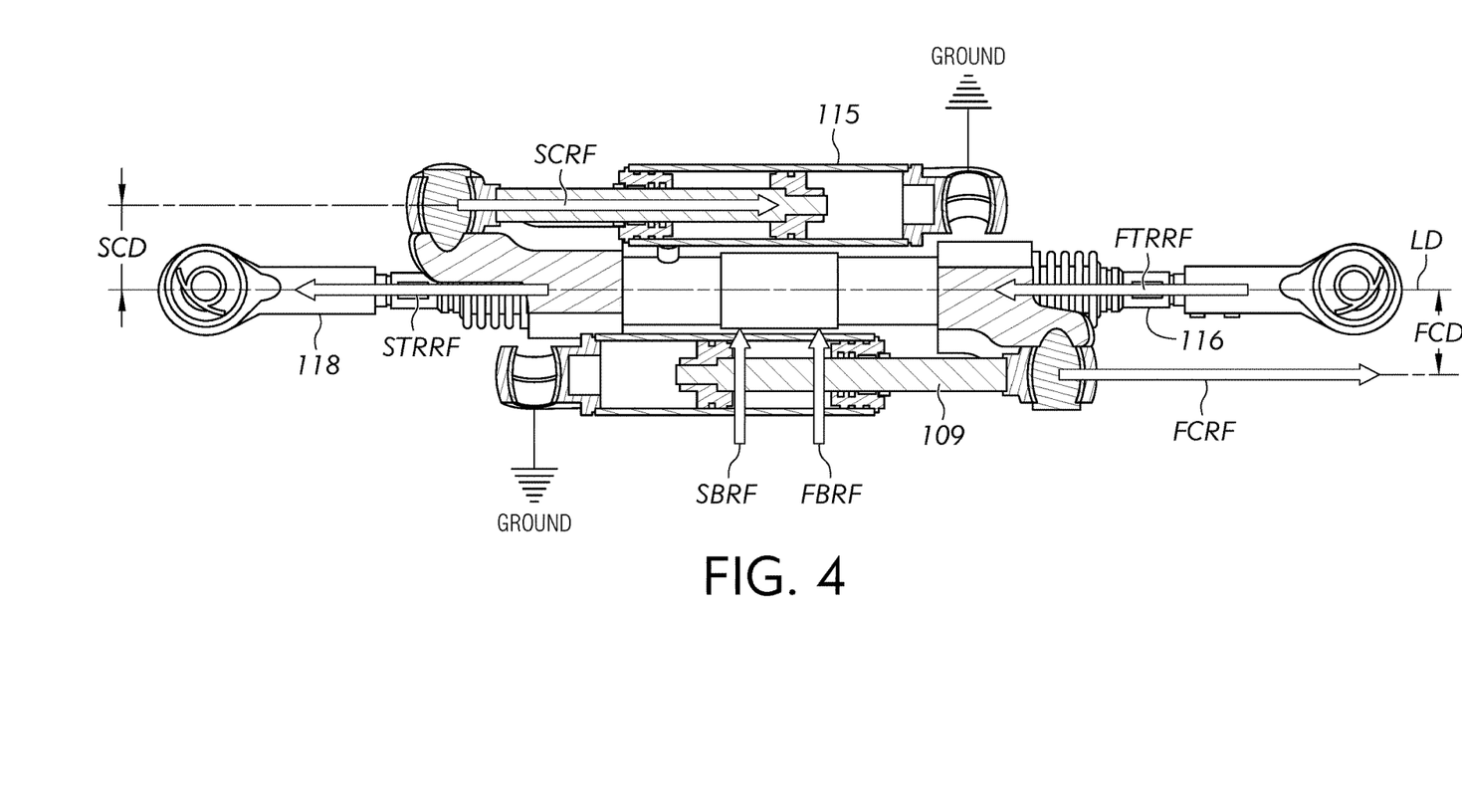
FIG. 4 is a partial cross-sectional view of the steering system of FIG. 1 illustrating radial forces and bushing reaction forces applied to the steering system.
Figure 5:
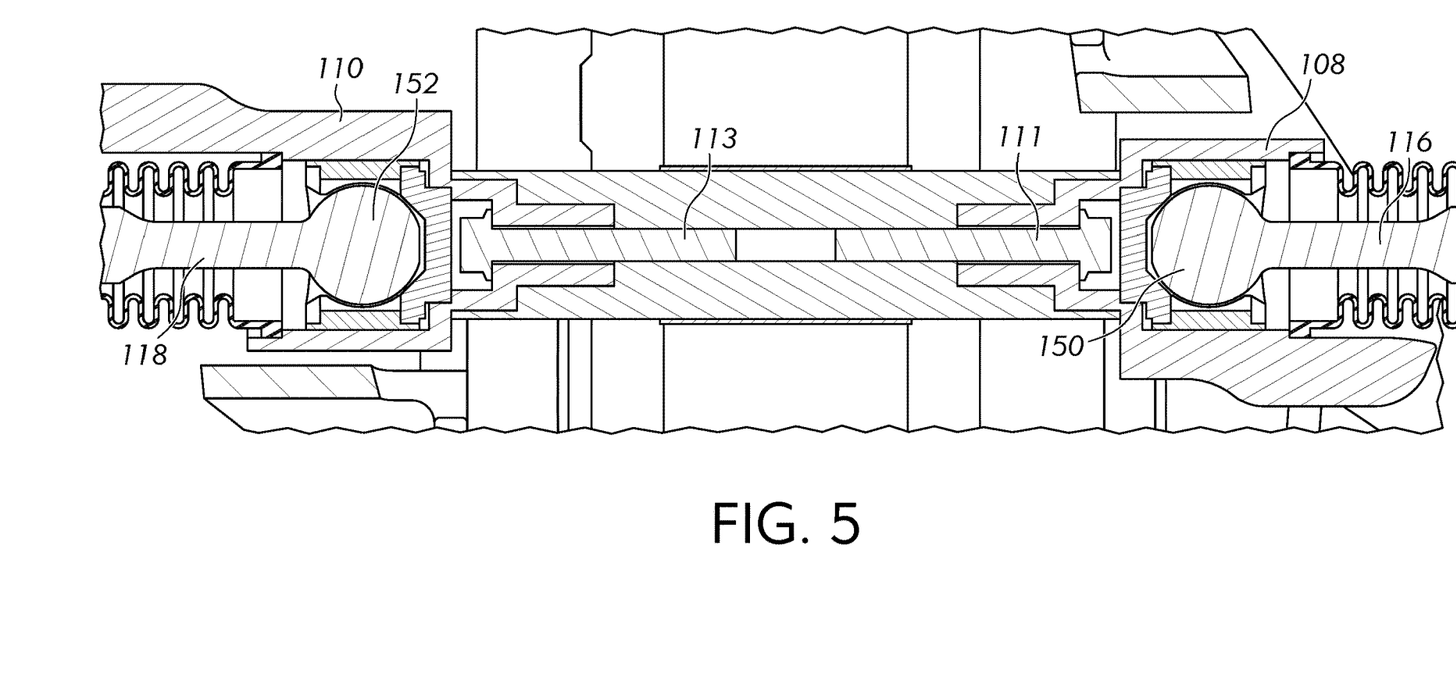
FIG. 5 is a partial cross-sectional view of the steering system of FIG. 1.
Figure 6:
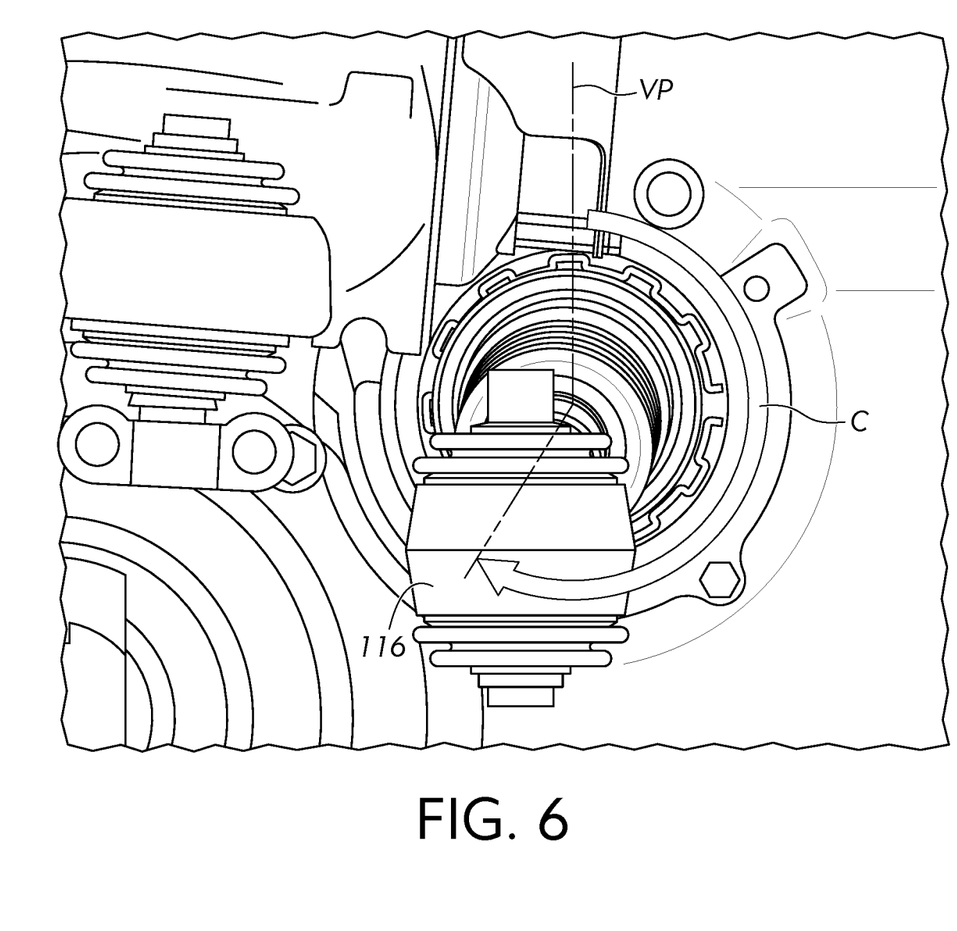
FIG. 6 is a partial end view of the steering system of FIG. 1.

The steering system 100 includes at least one of the first cylinder angle A, the second cylinder angle B, the first tie rod angle C, and the second tie rod angle D being optimized to minimize a net summation of the first cylinder radial force FCRF, the second cylinder radial force SCRF, the first tie rod radial force FTRRF, and the second tie rod radial force STRRF that is applied to the first and second support bushings 104 and 106. In one form, the net summation is less than any one of the first cylinder radial force FCRF, the second cylinder radial force SCRF, the first tie rod radial force FTRRF, and the second tie rod radial force STRRF that is applied to the first and second support bushings 104 and 106 as the first bushing reaction force FBRF and the second bushing reaction force SBRF, respectively. In a form, the first cylinder angle A and the second cylinder angle B are optimized such that the net summation of the first cylinder radial force FCRF, the second cylinder radial force SCRF, the first tie rod radial force FTRRF, and the second tie rod radial force STRRF is minimized such that the net summation is reduced to zero or near zero kN as applied to the first and second support bushings 104 and 106 as the first bushing reaction force FBRF and the second bushing reaction force SBRF, respectively. In a form, the net summation of the first cylinder radial force FCRF, the second cylinder radial force SCRF, the first tie rod radial force FTRRF, and the second tie rod radial force STRR is substantially zero kN as applied to the first and second support bushings 104 and 106 as the first bushing reaction force FBRF and the second bushing reaction force SBRF, respectively. In one form, the first steering hydraulic cylinder 109 is arranged at the first cylinder angle A and the second steering hydraulic cylinder 115 is arranged at the second cylinder angle B such that a net summation, at the first and second support bushings 104 and 106, of the first cylinder radial force FCRF, the second cylinder radial force SCRF, the first tie rod radial force FTRRF, and the second tie rod radial force STRRF is substantially zero kN as applied to the first and second support bushings 104 and 106 as the first bushing reaction force FBRF and the second bushing reaction force SBRF, respectively. Although the net summation of the forces and moments applied as the first bushing reaction force FBRF and the second bushing reaction force SBRF is optimized to zero kN it is within the scope of the present disclosure that the net summation can be optimized to an amount greater than zero kN such as less than 10 kN, less than 25 kN, or some other desired amount. As can be appreciated the angles A, B, C, and D of the first steering hydraulic cylinder 109, second steering hydraulic cylinder 115, first tie rod 116, and second tie rod 118 are optimized to balance their corresponding forces to end up with a net zero kN at the first and second bushings 104 and 106.

A method of assembling the steering system 100 for a work vehicle is described next. The first steering hydraulic cylinder 109 is arranged at the first cylinder angle A relative to the vertical plane VP of the drag link 102 to induce the first cylinder radial force FCRF that is distributed between the first and second support bushings 104 and 106 and contributes to the first bushing reaction force FBRF and the second bushing reaction force SBRF. The second steering hydraulic cylinder 115 is arranged at the second cylinder angle B relative to the vertical plane VP of the drag link 102 to induce the second cylinder radial force SCRF that is distributed between the first and second support bushings 104 and 106 and contributes to the first bushing reaction force FBRF and the second bushing reaction force SBRF.

The first tie rod 116 is attached to the drag link 102 to induce the first tie rod radial force FTRRF that is distributed between the first and second support bushings 104 and 106 and contributes to the first bushing reaction force FBRF and the second bushing reaction force SBRF. The second tie rod 118 is attached to the drag link 102 to induce the second tie rod radial force STRRF that is distributed between the first and second support bushings 104 and 106 and contributes to the first bushing reaction force FBRF and the second bushing reaction force SBRF.

One or both of the first cylinder angle A and the second cylinder angle B are optimized to minimize a net summation of the first cylinder radial force FCRF, the second cylinder radial force SCRF, the first tie rod radial force FTRRF, and the second tie rod radial force STRRF that is resolved at the first and second bushings 104 and 106 as the first bushing reaction force FBRF and the second bushing reaction force SBRF. In a form, the net summation of forces is minimized to substantially 0 kN, or minimized to less than 10 kN, less than 25 kN, or some other desired amount.

The method of assembling can include arranging the first tie rod 116 at the first tie rod angle C relative to the vertical plane of the drag link to induce the first tie rod radial force FTRRF and arranging the second tie rod 118 at the second tie rod angle D relative to the vertical plane VP of the drag link 102 to induce the second tie rod radial force STRRF and optimizing the first and the second tie rod angles C and D to minimize the net summation of the first cylinder radial force FCRF, the second cylinder radial force SCRF, the first tie rod radial force FTRRF, and the second tie rod radial force STRRF that is resolved at the first and second bushings 104 and 106 as the first bushing reaction force FBRF and the second bushing reaction force SBRF.

The method can further include arranging the first steering hydraulic cylinder 109 laterally offset a first cylinder distance FCD from the longitudinal axis LD to induce the first cylinder moment that is distributed between the first and the second support bushings 104 and 106 and contributes to the first bushing reaction force FBRF and the second bushing reaction force SBRF. The method also includes arranging the second steering hydraulic cylinder 115 laterally offset a second cylinder distance SCD from the longitudinal axis LD to induce the second cylinder moment that is distributed between the first and the second support bushings 104 and 106 and contributes to the first bushing reaction force FBRF and the second bushing reaction force SBRF. The first tie rod moment FTRM from the first tie rod 116 and the second tie rod moment STRM from the second tie rod 118 are applied to the first and second support bushings 104 and 106. At least one of the first cylinder distance FCD for the first steering hydraulic cylinder 109 and the second cylinder distance SCD for the second steering hydraulic cylinder 115 is optimized to minimize a net summation, at the first and second support bushings 104 and 106, of the first cylinder moment FCM, the second cylinder moment SCM, the first tie rod moment FTRM, and the second tie rod moment STRM.

The method can further include positioning the first steering hydraulic cylinder 109 in a direction opposite to a direction of the second steering hydraulic cylinder 115 relative to the vertical plane VP of the drag link 102.

The method can further include attaching the first steering hydraulic cylinder 109 to the first connector 108 and attaching the first tie rod 116 to the first connector 108. Similarly, the method includes attaching the second steering hydraulic cylinder 115 to the second connector and attaching the second tie rod 118 to the second connector 110.

The method can further include arranging at least one of the first cylinder angle A of the first steering hydraulic cylinder 109 and the second cylinder angle B of the second steering hydraulic cylinder 115 to cancel the forces induced by the first tie rod 116, the second tie rod 118, the first steering hydraulic cylinder 109, and the second steering hydraulic cylinder 115.

Beneficially, the steering system 100 provides a steering function for an independent front suspension of a vehicle. The steering system 100 includes first and second hydraulic cylinders 109, 115 that are connected to the drag link 102. The drag link 102 includes the first and second side steering knuckles or connectors 108, 110 and first and second bushings 104, 106. The first and second hydraulic cylinders 109, 115 are orientated to provide the same steering force independent of the direction of translation of the first and second tie rods 116, 118 and to minimize the induced radial load on the first and second bushings 104, 106 and the high pressure seals formed by the first and second bushings 104, 106.

The steering system 100 replaces a single double acting steering cylinder with the first and second hydraulic cylinders 109, 115 and the drag link 102. The steering system 100 moves the high pressure oil to the first and second hydraulic cylinders 109, 115 that are isolated from the high radial loads that are induced in a single double acting steering cylinder. The orientation of the first and second hydraulic cylinders 109, 115 provides a cancelation of the forces induced by the first and second tie rods 116, 118 and the first and second hydraulic cylinders 109, 115, and results in minimal radial load on the first and second bushings 104, 106.

As mentioned previously, the drag link 102 includes the first and the second connectors 108, 110 being bolted with the first bolt 111 that attaches the first connector 108 to the first support bushing 104 and the second bolt 113 that attaches the second connector 110 to the second support bushing 106. The drag link 102 includes the housing 103 with first and second support bushings 104, 106 that are positioned therein in a low pressure sealed cavity. The first and the second connectors 108, 110 and the drag link 102 are designed to maximize the spread of or distance between the first and second support bushings 104, 106. The rod or first ends 130, 132 of the first and second steering hydraulic cylinders 109, 115 are attached to the first and the second connectors 108, 110 on the drag link 102. The rod or first ends 130, 132 of the first and second steering hydraulic cylinders 109, 115 are offset from the longitudinal axis LD of the drag link 102. The offset induces a moment on the drag link 102 from the cylinder 109 that is partially canceled by the cylinder 115 and the radial force from the tie rod 116. Similarly, the offset induces a moment on the drag link 102 from the cylinder 115 that is partially canceled by the cylinder 109 and the radial force from the tie rod 118.

Figure 7:
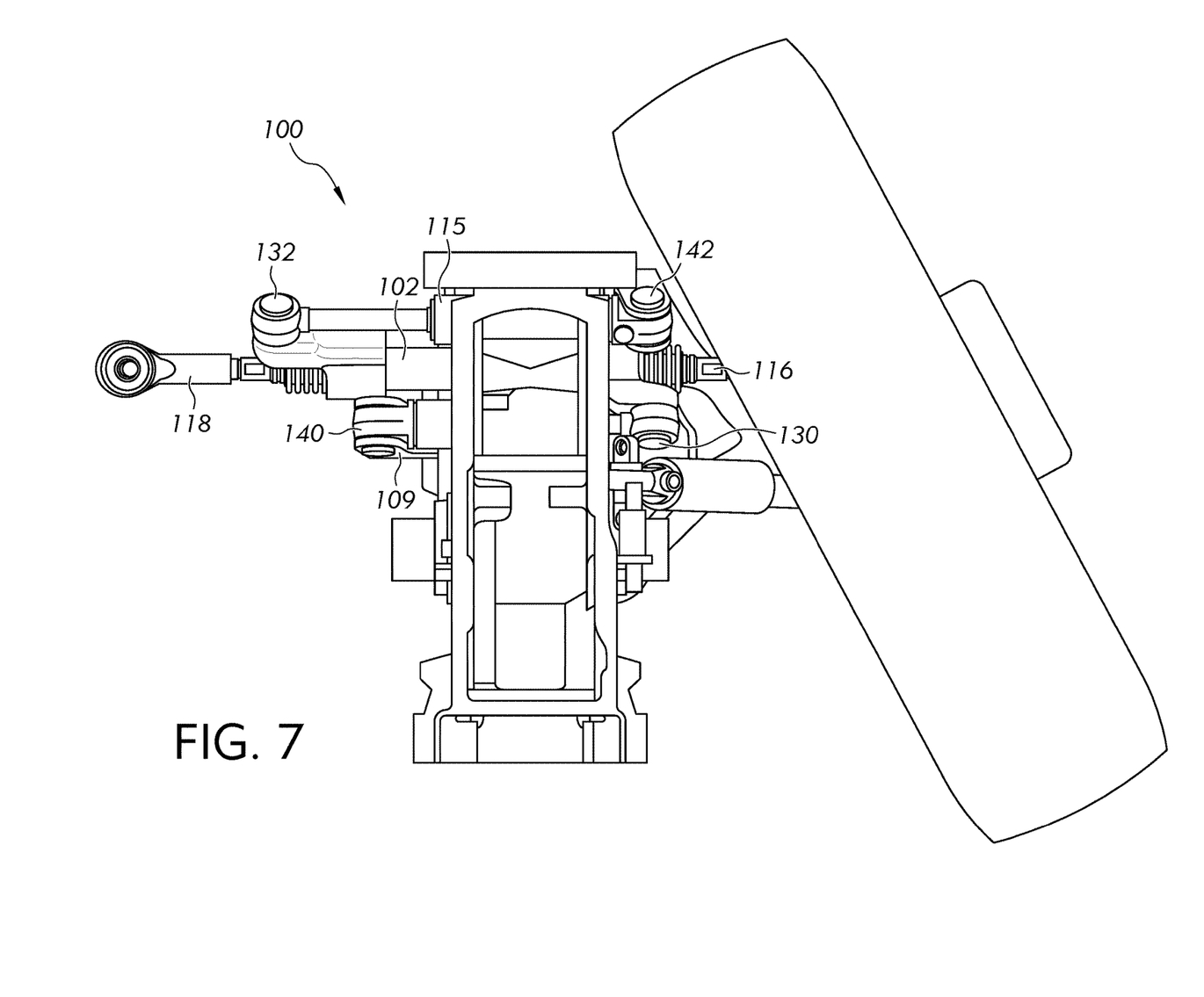
FIG. 7 is a top view of the steering system of FIG. 1 connected with an axle frame of a vehicle illustrating a left turn of a wheel.
Figure 8:
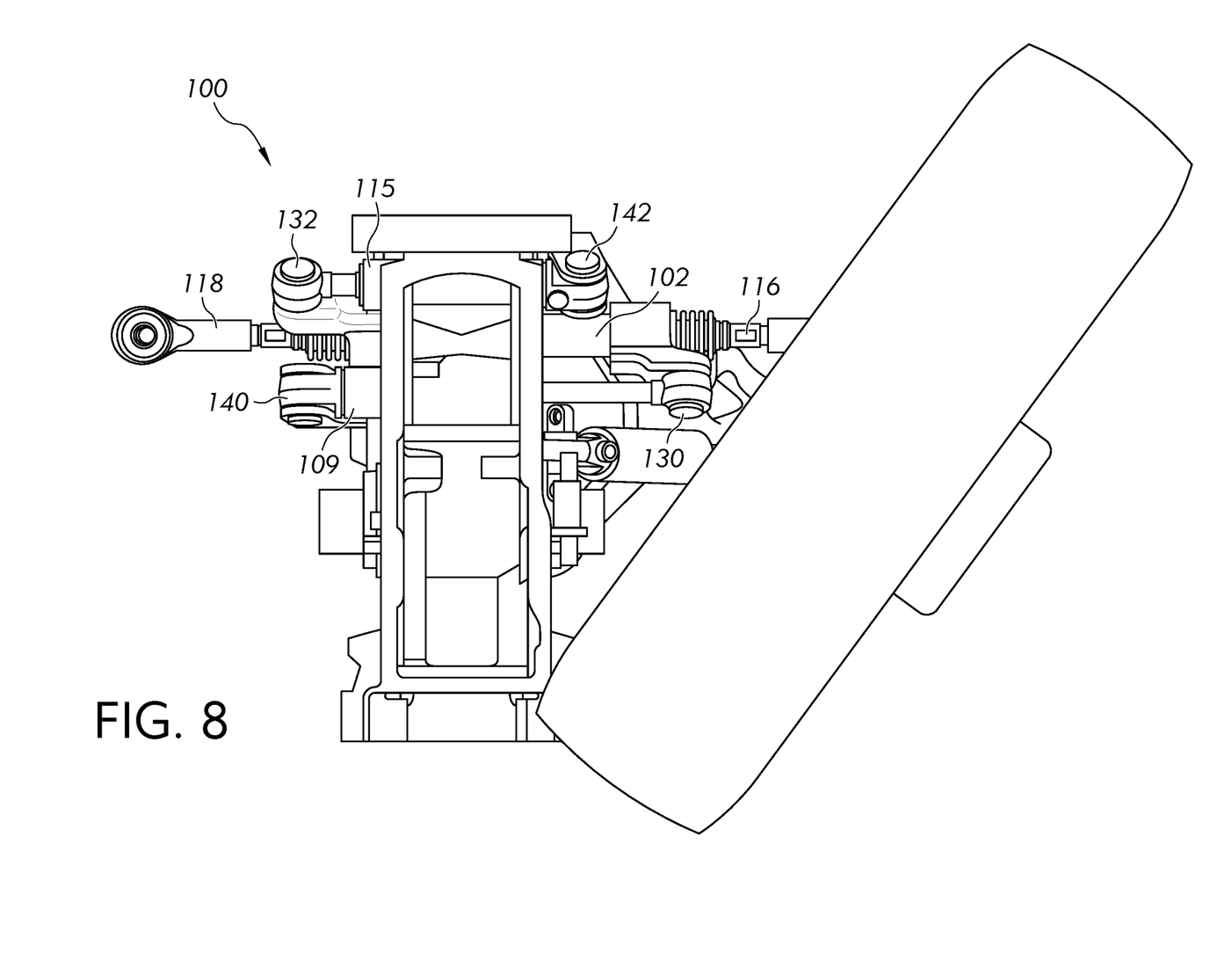
FIG. 8 is a top view of the steering system of FIG. 1 connected with an axle frame of a vehicle illustrating a right turn of a wheel.

The barrel or second ends 140, 142 of the first and second steering hydraulic cylinders 109, 115 are attached to the axle frame of the vehicle. As discussed previously, the first and second tie rods 116, 118 are connected to the first and the second connectors 108, 110 via the ball joints 150, 152. As illustrated in FIGS. 7 and 8, the first and second steering hydraulic cylinders 109, 115 are plumbed such that the barrel end of one of the cylinders and the rod end of the other cylinder are pressurized to move the drag link 102 in one direction. Correspondingly, the opposite ends of the first and second steering hydraulic cylinders 109, 115 are pressurized to move the drag link 102 in the other direction. For example, the barrel end 140 of the first steering hydraulic cylinder 109 and the rod or first end 132 of the second steering hydraulic cylinder 115 are pressurized to move the drag link 102 in one direction illustrated in FIG. 7 which is typical for a left turn of a vehicle. Similarly, the barrel end 142 of the second steering hydraulic cylinder 115 and the rod or first end 130 of the first steering hydraulic cylinder 109 are pressurized to move the drag link 102 in one direction illustrated in FIG. 8 which is typical for a right turn of a vehicle.

The advantage of the steering system 100 is that the sealing components for the high pressure oil for actuation are isolated from the high radial loads induced by the first and second tie rods 116, 118. This allows higher steering forces to be used to steer the wheels on the vehicle. The other advantage is that the two standard hydraulic cylinders that can be used for the first and second steering hydraulic cylinders 109, 115 are much less expensive to produce than a custom single cylinder design. The layout of the first and second steering hydraulic cylinders 109, 115 also has an advantage for freeing up space that can be used for other suspension components.

One application for the steering system 100 includes an independent front suspension with high induced radial forces on the tie rod connecting link. This application is beneficial for a large tractor wherein the drag link 102 is located in front of the axle axis. The drag link 102 can also be moved to behind the axle axis. Other applications include more or less than two cylinders to accomplish the cancelation of the radial loads.

The invention claimed is:

1. A steering system for a work vehicle, comprising:
a drag link having a longitudinal axis that spans the length of the drag link, the drag link having a vertical plane that is perpendicular to the longitudinal axis, the drag link having a first support bushing opposite a second support bushing;
a first steering hydraulic cylinder operably connected to the drag link, the first steering hydraulic cylinder oriented at a first cylinder angle relative to the vertical plane of the drag link to induce a first cylinder radial force that is distributed between the first and second support bushings;
a second steering hydraulic cylinder operably connected to the drag link, the second steering hydraulic cylinder oriented at a second cylinder angle relative to the vertical plane of the drag link to induce a second cylinder radial force that is distributed between the first and second support bushings;
a first tie rod operably connected to the drag link, the first tie rod oriented at a first tie rod angle relative to the vertical plane of the drag link to induce a first tie rod radial force that is distributed between the first and second support bushings;
a second tie rod operably connected to the drag link, the second tie rod oriented at a second tie rod angle relative to the vertical plane of the drag link to induce a second tie rod radial force that is distributed between the first and second support bushings; and
wherein at least one of the first cylinder angle, the second cylinder angle, the first tie rod angle, and the second tie rod angle is optimized to minimize a net summation of the first cylinder radial force, the second cylinder radial force, the first tie rod radial force, and the second tie rod radial force that is applied to the first and second support bushings.

2. The steering system of claim 1, wherein the net summation is less than any one of the first cylinder radial force, the second cylinder radial force, the first tie rod radial force, and the second tie rod radial force that is applied to the first and second support bushings.

3. The steering system of claim 1, wherein the first cylinder angle and the second cylinder angle are optimized such that the net summation of the first cylinder radial force, the second cylinder radial force, the first tie rod radial force, and the second tie rod radial force is minimized.

4. The steering system of claim 1, wherein the net summation of the first cylinder radial force, the second cylinder radial force, the first tie rod radial force, and the second tie rod radial force is substantially 0 kN.

5. The steering system of claim 1, wherein the first steering hydraulic cylinder is oriented in a direction opposite to a direction of the second steering hydraulic cylinder relative to the vertical plane that is perpendicular to the longitudinal axis.

6. The steering system of claim 1, wherein the first steering hydraulic cylinder is laterally offset a first cylinder distance from the longitudinal axis to induce a first cylinder moment and the second steering hydraulic cylinder is laterally offset a second cylinder distance from the longitudinal axis to induce a second cylinder moment, wherein the first and second cylinder moments are distributed between the first and second support bushings;
wherein the first tie rod and the second tie rod are positioned to induce a first tie rod moment and a second tie rod moment, respectively, wherein the first and second tie rod moments are distributed between the first and second support bushings; and
wherein at least one of the first cylinder distance and the second cylinder distance is optimized to minimize a net summation, at the first and second support bushings, of the first cylinder moment, the second cylinder moment, the first tie rod moment, and the second tie rod moment.

7. The steering system of claim 1, wherein the first steering hydraulic cylinder is arranged at the first cylinder angle and the second steering hydraulic cylinder is arranged at the second cylinder angle such that a net summation, at the first and second support bushings, of the first cylinder radial force, the second cylinder radial force, the first tie rod radial force, and the second tie rod radial force is substantially 0 kN.

8. The steering system of claim 1, wherein the drag link includes a first connector adjacent a first support bushing and a second connector adjacent a second support bushing, wherein a first end of the first steering hydraulic cylinder is attached to the first connector and a first end of the second steering hydraulic cylinder is attached to the second connector.

9. The steering system of claim 1, wherein the first steering hydraulic cylinder includes a second end attached to a frame of the work vehicle, the frame having an axle axis, the second steering hydraulic cylinder includes a second end attached to the frame, the drag link is located forward of the axle axis.

10. The steering system of claim 1, wherein the first steering hydraulic cylinder includes a second end attached to a frame of the work vehicle, the frame having an axle axis, the second steering hydraulic cylinder includes a second end attached to the frame, the drag link is located rearward of the axle axis.

11. A method of assembling a steering system for a work vehicle, comprising:
    providing a drag link having a first support bushing opposite a second support bushing, the drag link having a longitudinal axis that spans the length of the drag link, the drag link having a vertical plane perpendicular to the longitudinal axis;
    arranging a first steering hydraulic cylinder at a first cylinder angle relative to the vertical plane of the drag link to induce a first cylinder radial force that is distributed between the first and second support bushings;
    arranging a second steering hydraulic cylinder at a second cylinder angle relative to the vertical plane of the drag link to induce a second cylinder radial force that is distributed between the first and second support bushings;
    attaching a first tie rod to the drag link to induce a first tie rod radial force that is distributed between the first and second support bushings;
    attaching a second tie rod to the drag link to induce a second tie rod radial force that is distributed between the first and second support bushings;
    optimizing at least one of the first cylinder angle and the second cylinder angle to minimize a net summation of the first cylinder radial force, the second cylinder radial force, the first tie rod radial force, and the second tie rod radial force that is resolved at the first and second bushings.

12. The method of claim 11, wherein the net summation of forces is minimized to substantially 0 kN.

13. The method of claim 11, further comprising:
    arranging the first tie rod at a first tie rod angle relative to the vertical plane of the drag link to induce the first tie rod radial force;
    arranging the second tie rod at a second tie rod angle relative to the vertical plane of the drag link to induce the second tie rod radial force; and
    optimizing the first and the second tie rod angles to minimize the net summation of the first cylinder radial force, the second cylinder radial force, the first tie rod radial force, and the second tie rod radial force that is resolved at the first and second bushings.

14. The method of claim 11, further comprising:
    arranging the first steering hydraulic cylinder laterally offset a first cylinder distance from the longitudinal axis to induce a first cylinder moment that is distributed between the first and the second support bushings;
    arranging the second steering hydraulic cylinder laterally offset a second cylinder distance from the longitudinal axis to induce a second cylinder moment that is distributed between the first and the second support bushings;
    applying a first tie rod moment from the first tie rod on the first and second support bushings; and
    applying a second tie rod moment from the second tie rod on the first and second support bushings;
    wherein at least one of the first cylinder distance and the second cylinder distance is optimized to minimize a net summation, at the first and second support bushings, of the first cylinder moment, the second cylinder moment, the first tie rod moment, and the second tie rod moment.

15. The method of claim 11, further comprising:
    positioning the first steering hydraulic cylinder in a direction opposite to a direction of the second steering hydraulic cylinder relative to the vertical plane perpendicular to the longitudinal axis of the drag link.

16. The method of claim 11, wherein the drag link includes a first connector adjacent a first support bushing and a second connector adjacent a second support bushing,
    attaching the first steering hydraulic cylinder to the first connector, the first connector sized to receive the first tie rod; and
    attaching the second steering hydraulic cylinder to the second connector, the second connector sized to receive the second tie rod.

17. The method of claim 11, further comprising:
    arranging at least one of the first cylinder angle and the second cylinder angle to cancel the forces induced by the first tie rod, the second tie rod, the first steering hydraulic cylinder, and the second steering hydraulic cylinder.

* * * * *